United States Patent [19]

Frommer et al.

[11] Patent Number: 4,511,494

[45] Date of Patent: Apr. 16, 1985

[54] SOLUTION OF A CHALCOGEN-CONTAINING POLYMER AND PROCESS OF FORMING CONDUCTING POLYMER ARTICLES THEREFROM

[75] Inventors: Jane E. Frommer, Mendham Township, Morris County; Ronald L. Elsenbaumer, Morristown; Douglass S. Davidson, Dover, all of N.J.

[73] Assignee: Allied Corporation, Morris Township, Morris County, N.J.

[21] Appl. No.: 587,720

[22] Filed: Mar. 8, 1984

Related U.S. Application Data

[60] Division of Ser. No. 432,045, Sep. 30, 1982, Pat. No. 4,452,727, which is a continuation-in-part of Ser. No. 393,010, Jun. 28, 1982, abandoned.

[51] Int. Cl.$^3$ .............................................. H01B 1/06
[52] U.S. Cl. ..................................... 252/518; 427/82; 252/500
[58] Field of Search ...................... 252/500, 518, 512; 524/401; 427/82, 85, 126.1; 204/130, 131, 140

[56] References Cited

U.S. PATENT DOCUMENTS

| 4,222,903 | 9/1980 | Heeger et al. | 252/518 |
| 4,269,738 | 5/1981 | Dez | 252/500 |
| 4,375,427 | 3/1983 | Miller et al. | 252/518 |
| 4,440,669 | 4/1984 | Ivory et al. | 252/518 |

Primary Examiner—Josephine L. Barr
Attorney, Agent, or Firm—Alan M. Doernberg

[57] ABSTRACT

A polymer solution is formed from a sulfur- or oxygen-containing aromatic polymer solute such as poly(phenylene sulfide) or poly(phenylene oxide), a Lewis Acid solute derivative (dopant) such as arsenic hexafluoride and a liquid halide solvent such as arsenic trifluoride. The solutions are especially useful for casting conductive polymer articles.

8 Claims, No Drawings

SOLUTION OF A CHALCOGEN-CONTAINING POLYMER AND PROCESS OF FORMING CONDUCTING POLYMER ARTICLES THEREFROM

This application is a division of application Ser. No. 432,045, filed 9/30/82 now U.S. Pat. No. 4,452,727 which, in turn, is a continuation-in-part of Ser. No. 393,010, filed June 28, 1982 abandoned.

BACKGROUND OF THE INVENTION

The present invention relates to polymer solutions containing a sulfur-containing or oxygen-containing aromatic polymer, methods of forming such solutions, methods of using such solutions to form conducting polymer articles including films and methods of using such solutions as electrically conducting liquids.

Conductive poly(p-phenylene sulfide) and other chalcogenide polymers rendered conductive by doping with a Lewis Acid halide and other dopants are disclosed in European published patent application No. 31,444 (July 8, 1981) the subject matter of which is included in U.S. Pat. No. 4,375,427, issued Mar. 1, 1983. Such materials are prepared, in some forms, by introducing a gaseous dopant into the solid polymer pellet.

It is indicated in U.S. Pat. No. 4,375,427 that arsenic trifluoride gas, when introduced with arsenic pentafluoride gas as dopant, increases the doping efficiency.

In the general field of conducting polymers, such as polyphenylene, polyphenylene sulfide, polypyrrole and polyacetylene, it has been heretofore believed impossible to dope one of these polymers to the extent that it becomes a semiconductor or conductor and thereafter dissolve the polymer. In the absence of such solutions, the ability to form certain articles out of conducting polymers, and especially conducting or semiconducting polymer films, is restricted. In particular, doping with a gas after forming a polymer article is known to expand or distort the polymer article. Thus a need exists for techniques to facilitate the production of conductive polymers, to facilitate the doping process and, especially, to form shaped articles such as films and fibers of conducting polymers.

BRIEF DESCRIPTION OF THE INVENTION

It has been discovered that poly(p-phenylene sulfide), poly(p-phenylene oxide), and similar chalcogen-linked aromatic polymers dissolve in arsenic trifluoride liquid when doped by electronic acceptor doping agents to form an electronically conductive solution useful for casting conductive films and other conductive polymer articles. It is believed that these solutions can also be formed from other halides and oxyhalides with characteristics similar to arsenic trifluoride. Accordingly, the present invention includes a solution comprising a solvent selected from the group consisting of arsenic trifluoride, arsenic trichloride, arsenic tribromide, phosphorus trifluoride, phosphorus pentafluoride, phosphorus trichloride, phosphorus oxytrichloride, titanium tetrachloride, boron trifluoride, boron trichloride, boron tribromide, antimony trichloride, and antimony pentachloride, a polymer solute comprising aromatic moieties directly linked by divalent, trivalent or tetravalent sulfur or divalent oxygen, and a dopant solute comprising a halide or oxyhalide anion of a group IIIA, IIIB, IVA, IVB, VA, VB, VIIIA or VIB metal or metalloid or of phosphorus, sulfur, selenium or boron.

The present invention also includes a method of forming such solutions by dissolving said polymer solute and said dopant solute, either separately or in combination as a doped polymer, in said solvent. The invention further includes a method of forming a conductive article which comprises the steps:

(a) forming the above solution, and
(b) removing from the solution the solvent together with any excess Lewis Acid halide beyond that absorbed by the polymer solute as the polymer solute solidifies. Preferably, the solvent together with any excess Lewis Acid halide or oxyhalide is removed by evaporation. The process is capable of forming conductive polymer articles of various shapes, with a low degree of porosity and good mechanical properties compared to similarly conductive articles prepared by reaction of the polymer with the Lewis Acid halide alone.

DETAILED DESCRIPTION OF THE INVENTION

The polymer used in the present invention may be any of the materials described in the above-referenced applications of Ivory et al., and may especially be any structure with substituted or unsubstituted aromatic moieties such as p-phenylene, m-phenylene, naphthalene, methyl-1,5-phenylene, linked directly by oxygen in the form of ether linkages or by sulfur either in the form of sulfide linkages, in trivalent forms such as —RS— where R is alkyl, in tetravalent forms such as —S(=O)— or in the form of heterocyclic moieties containing divalent ring sulfurs. It is contemplated that some aromatic rings may be linked directly by carbon-carbon covalent bonds while others are linked by sulfide; that some aromatic moieties will be linked by sulfide while others are linked by heterocyclic moieties; that some aromatic moieties are linked by sulfide while others are linked by trivalent or tetravalent sulfur (e.g., sulfoxy); that some aromatic moieties will be linked by oxygen ether. Examples of suitable heterocyclic moieties include thiophenes and substituted thiophenes such as methyl thiophene and dimethyl thiophene. Thus representative polymers suitable for use in the present invention include poly(p-phenylene sulfide), poly(p-phenylene oxide), poly(m-phenylene sulfide), poly[4,4'-thio(1,1'-biphenyldiyl)], poly[4,4'-thio(diphenyl sulfoxide)], poly(paraphenoxyphenyl sulfide), poly(para-phenylene disulfide), poly(4'-sulfinylphenyl), poly(thio-2,8-dibenzothiophendiyl) and poly(thio-3,7-dibenzothiophendiyl).

The dopant solute used in the present invention may be the product of any of the Lewis Acid halides or oxyhalides used as electron-acceptor dopants in the preparation of conductive polymers based upon polyphenylene, polyphenylene sulfide, poly(phenylene oxide), polyacetylene or polypyrrole. Examples of such dopants include solutes generated by employing as reactant the neutral halides represented by arsenic pentafluoride, antimony pentafluoride, antimony pentachloride, molybdenum pentachloride, and molybdenum oxytetrachloride. Also included are the solutes generated by employing as reactant superoxidant salts such as the nitronium, nitrosonium, oxonium and dioxygenyl salts of hexafluoroarsenate, hexafluoroantimonate, hexafluorophosphate and tetrafluoroborate. Since, in the present invention, the polymer may be doped with the dopant prior to contact with the solvent, the dopant solute may also be an anion introduced electrochemically into the polymer in the manner described by MacDiarmid et al. in U.S. Pat. No. 4,321,114 (Mar. 23, 1982). Thus, for example, the polymer (e.g. poly(phenylene sulfide)) may be electrochemically doped by the anions of various salts including lithium perchlorate, lithium hexafluoroarsenate, lithium hexafluorophosphate, lithium tetrafluoroborate, lithium tetrachloroaluminate, sodium hexachloroantimonate and potassium hexafluoroantimonate.

The solvent used in the present invention is preferably arsenic trifluoride, but it may also be other halides having a liquid phase under atmospheric pressure for at least one temperature between about $-150°$ C. and about $+100°$ C., with preferably a liquid point at atmospheric pressure for at least one temperature between about $-100°$ C. and about $+30°$ C. Such solvents include especially phosphorus trifluoride, phosphorus pentafluoride, phosphorus trichloride, phosphorus oxytrichloride, titanium tetrachloride, boron trifluoride, boron trichloride, boron tribromide, antimony pentachloride, antimony trichloride, arsenic trichloride and arsenic triboromide, in addition to arsenic trifluoride.

The proportions of polymer, dopant and solvent are not particularly critical, but the following guidelines are believed important for achieving solutions particularly useful in the present invention. First, some minimum degree of doping of the polymer is believed necessary to achieve reasonable solubility in the solvent. In the case of arsenic pentafluoride as dopant, poly(p-phenylene sulfide) as polymer and arsenic trifluoride as solvent, Example 2 illustrates a technique wherein this minimum degree of doping can be determined. In general, the treatment of a relatively large quantity of polymer with a relatively low level of dopant gas, in the presence of the solvent liquid, will dissolve only a part of the polymer. By measuring the quantity of polymer being doped and entering solution (either by measuring the quantity of residual polymer or measuring the quantity of an article cast from the solution), the approximate minimum dopant/polymer ratio can be determined. It is believed that a similarly determined minimum will exist at any solution temperature for each combination of polymer, dopant and solvent, which minimum can be determined by routine experimentation.

The amount of solvent as a proportion of the amount of polymer is not believed to be critical, since any amount of solvent as a liquid will form at least a viscous gel with highly doped polymer. It is preferred, however, to use sufficient liquid solvent to lower the viscosity of the gel or solution to a point where it flows at least sufficiently to conform to a container shape or mold in a reasonably short period (e.g. in 30 minutes or less). Preferably, the solvent is present in sufficient amounts to lower the viscosity to less than about 1000 centipoise, more preferably between about 1 to 100 centipoise.

In addition to the polymer, the dopant and the solvent, fourth components may also be present which either dissolve or do not dissolve in the solution. In the case of dissolvable components, materials may be present which alter the physical or mechanical properties of either the solution or the article eventually cast from the solution. Examples of such materials include phenylene oligomers, phenylene sulfide oligomers, phenylene oxide oligomers, polyethylene oxides and glymes. In the case of non-soluble fourth components, materials may be present which either fill or form a substrate for the conductive polymer cast from the solution. These fourth components include other conductive polymers, other polymers such as polyacetylene which may become conductive upon doping, graphite, metal conductors, reinforcing fibers and inert fillers (such as clays and glass).

One preferred method of forming the present solutions is to react, simultaneously, the polymer, the dopant and the solvent as a liquid. Thus, for example, by introducing poly(p-phenylene sulfide) as a solid powder, arsenic pentafluoride as a gas and arsenic trifluoride as a liquid into a mixing vessel, a solution is quickly formed, from which conductive poly(phenylene sulfide) can be cast. The conditions of such mixing are not critical, provided that sufficient arsenic trifluoride vapor pressure be maintained for significant amounts of arsenic trifluoride to remain in the liquid state.

An alternate technique is to mix first the polymer and the solvent, which in most cases will remain as a two-phase system almost indefinitely. Thus, for example, if poly(p-phenylene sulfide) powder is admixed with arsenic trifluoride liquid, the powder will remain on or suspended in the solution for extended periods under normal conditions. The addition of a dopant, such as arsenic pentafluoride gas, causes the powder to be doped and, almost instantaneously thereafter, causes the doped polymer to go into solution.

A second alternate technique is to form the dopant solute from part of the solvent, either in the presence of the polymer solute or followed by addition of polymer solute. Thus, for example, adding $F_2$ or $ClF$ to arsenic trifluoride liquid produces $AsF_5$ or $AsClF_4$, which dopes poly(phenylene sulfide). The doped polymer then dissolves in the unreacted arsenic trifluoride.

A suitable, but somewhat less preferred method of forming the solution, is to prereact the dopant with the polymer before introducing solvent. Thus, for example, if polyphenylene sulfide, either in powder, pellet or film form, is reacted with arsenic pentafluoride gas, it will dope so as to become a conductive polymer. If the solvent (e.g. liquid arsenic trifluoride) is introduced soon after the polymer is rendered conductive, it will dissolve the doped polymer in essentially the same fashion as if the three materials were introduced simultaneously. If, however, the conductive polymer is allowed to stand for substantial periods at room temperature prior to introduction of the solvent, it will change in some fashion so as to be less soluble. While applicants do not wish to be tied to a particular theory, it is possible that the doped polymer crosslinks upon standing and that the crosslinked conductive polymer is less soluble in the solvent than the freshly doped polymer. While this phenomenon has been observed qualitatively with $AsF_5$-doped poly(phenylene sulfide) and $AsF_3$, it is believed that similar phenomena will occur for various combinations of polymer and dopant within the scope of the present invention, if allowed to stand for extended periods prior to introduction of the solvent. This may be avoided, somewhat, if the doped polymer is maintained at extremely low temperatures prior to introducing the solvent.

Various methods are contemplated for using the solution of the present invention. First, it is contemplated to remove the solvent and excess dopant precursor (e.g. arsenic pentafluoride), if present, from the solution. The solvent is removed preferably by evaporation, but alternatively by extraction with an extractant in which the solvent and dopant precursor are substantially more soluble than the doped polymer. As will be appreciated by those skilled in polymer processing, the ability to form polymer articles by removing a solvent from a solution enables one to prepare articles of a wide variety of shapes and sizes. Thus, for example, by removing volatiles from the present solution spread on a surface, films of any desired thickness can be prepared. By extruding the solution through a die, fibers or films can be made. Similarly, by removing volatiles from the solution in a mold of various shapes, shaped articles conforming in shape to the mold can be prepared. It will be appreciated that some shrinkage might occur between the solution in its last flowable state to the final article, but such shrinkage is conventionally accounted for in molding polymers from solutions. It is also contemplated that, once a solution is formed, a partial or substantial removal of solvent will occur prior to placing the solution on a surface or in a mold, with the final venting of solvent occurring on the surface or in the mold. It appears that films which are cast from solutions exposed to DC current display improved conductivities, as in Example 7. It is contemplated that, if fourth or additional soluble components are introduced into the solution, they will, unless also volatile, be present in the shaped article formed. If the fourth component is a non-volatile liquid, then the removal of volatile components may leave a new liquid form of doped conducting polymer.

In the event that fourth or additional nonsoluble components are present (or suspended) in the solution, the doped polymer will form around, or be filled with, the insoluble material. If, for example, the additional components are fibers, the relative amounts of fibers and doped polymer remaining will cause either the polymer to be fiber-filled, the fibers to be polymer impregnated or some intermediate composite of fibers and doped polymer to be formed. In the case of systems wherein the amount of non-soluble component greatly exceeds the doped polymer remaining, individual particles or shapes of non-soluble component coated or impregnated with doped polymer will be formed. Examples of articles formed from non-soluble components and the present polymer solutions include conductive housings for sensitive electronic equipment (microprocessors), infrared and microwave absorbing shields, flexible electrical conducting connectors, conductive bearings and brushes and semiconducting photoconductor junctions.

It is also contemplated to use the present solutions as such as either liquid conductors or liquid semiconductors, much in the manner that liquid mercury is used in various devices. Examples of such devices include gravity switches, fluid level detecting devices or other electrical or electronic switches. Such use is based upon the conductivity of the doped solution, which it has been found in the case of poly(p-phenylene sulfide) doped with arsenic pentafluoride in arsenic trifluoride can represent a relatively high conductivity (at least about 5 S/cm) which appears in certain instances to be of an electronic rather than ionic nature.

A fourth application for the present polymer solutions is in the doping of other materials, and especially other conjugated backbone polymers which could also be doped by the electron-acceptor dopant alone. Such doping may occur as a part of the process of casting onto the second polymer article to be doped the polymer solution, but may also be accomplished without, necessarily, casting the conductive polymer from the solution.

EXAMPLE 1

Poly(p-phenylene sulfide) powder (200 mg) was placed in an anaerobic reaction vessel, into which 5 mL of arsenic trifluoride was then transferred under vacuum with liquid nitrogen cooling. The powder at this point floated on the liquid at room temperature, indicating lack of solubility (confirmed by spectroscopy). Upon exposing the slurry to a molar excess of arsenic pentafluoride gas (a large volume at a pressure varying between 200 and 700 torr (26.6–93.1 kPa)) at room temperature, the powder began immediately to dope (indicated by a change of color from beige to dark blue) and dissolve in the arsenic trifluoride. On complete dissolution (within minutes), the volatiles were removed under reduced pressure, casting a doped polymer film with a conductivity of approximately 0.1 S/cm. This procedure was repeated several times to achieve conductivities as low as about 0.1 and as high as about 0.5 S/cm, based possibly upon the degree of polymer doping as it dissolved.

EXAMPLE 2

Poly(p-phenylene sulfide) (578 mg 5.35 meq) was treated with arsenic pentafluoride gas (32.5 mL at 224 torr (29.8 kPa) or 0.39 mmol) in the presence of 8 mL of arsenic trifluoride liquid. Only 72.5 mg of the poly-(p-phenylene sulfide) doped and entered solution. When the slurry was filtered, and the filtrate was dried at reduced pressure, the resulting film exhibited a composition of $C_6H_{4.3}S_{1.1}(As_{1.0}F_{3.0})_{0.5}$ and a conductivity of $6 \times 10^{-3}$ S/cm, indicating a lower degree of doping than the films cast from the solutions in example 1. It is believed that this level of doping corresponds approximately to the minimum ratio of arsenic pentafluoride to poly(p-phenylene sulfide) to form solutions of the two in arsenic trifluoride at room temperature.

EXAMPLE 3

Poly(p-phenylene sulfide) powder (227 mg) was doped with $AsF_5$ and dissolved in $AsF_3$ (about 11 mL) as described in Example 1. The resulting blue solution was allowed to sit for about 18 hours, by which time it had turned green. On removal of volatiles under vacuum, a film was cast having a conductivity of 8.8 S/cm.

EXAMPLE 4

Poly(p-phenylene sulfide) (200 mg) was combined with $AsF_3$ to form a slurry as described in Example 1. $SbF_5$ (about 0.1 mL) was then transferred under vacuum onto the liquid nitrogen cooled slurry. On warming to room temperature, the polymer doped and entered solution. While this solution would be useful as such, a proposed reaction between $SbF_5$ and $AsF_3$ limits its stability; and over the next 12 hours it lost fluidity and then evolved gasses.

EXAMPLE 5

Poly(thio-2,8-dibenzothiophendiyl) (50 mg) was doped with $AsF_5$ and then dissolved in $AsF_3$ as described in Example 1. The resulting solution was deep blue-green in color.

EXAMPLE 6

Poly(p-phenylene sulfide) powder was doped with $AsF_5$ and dissolved in $AsF_3$ as described in Example 1, yielding a flexible blue-black film of 0.2 S/cm conductivity. The film was then extensively extracted with:

alkali (KOH) in alcohol (95% ethanol and isopropanol); acid (HCl) in alcohol (95% ethanol and isopropanol); alcohol (95% ethanol and isopropanol) until neutral; ethanol (anhydrous); and finally acetone. This extraction removed inorganic species (including the dopant), and resulted in a flexible, gold film. The gold film, on exposure to $AsF_5$ gas in the presence of $AsF_3$ liquid, doped to a deep green film having a conductivity of $3.6 \times 10^{-2}$ S/cm.

The solution doping process (described in Example 1) results in a polymer product which is amenable to 're-doping' to reasonable conductivities, the first such reported instance of the recyclability of a conducting polymer.

EXAMPLE 7

Poly(p-phenylene sulfide) powder (250 mg) was doped with $AsF_5$ and dissolved in $AsF_3$ (10 mL) in the presence of a platinum electrode. A DC current was passed through the blue polymer solution for 36 hours. After removal of volatiles under vacuum, the resulting blue-black shiny film had a conductivity of 195 S/cm.

EXAMPLE 8

Poly(p-phenylene oxide) (250 mg) was doped with $AsF_5$ and dissolved in $AsF_3$ as described in Example 7. A DC current was passed through the polymer solution for 24 hours. After removal of volatiles under vacuum, the shiny blue film of doped polymer had a conductivity of 1 S/cm to 125 S/cm (depending on particular film piece sampled).

EXAMPLE 9

Poly(p-phenylene oxide) (250 mg) was doped with $AsF_5$, dissolved with $AsF_3$, and allowed to sit for 18 hours in solution as described in Example 3. After removal of volatiles under vacuum, the resulting chunks of doped polymer displayed a conductivity of $10^{-2}$ S/cm.

What is claimed is:

1. The process of forming a conductive article which comprises the steps:
    (a) forming a solution comprising a solvent selected from the group consisting of arsenic trifluoride, arsenic trichloride, arsenic tribromide, phosphorus trifluoride, phosphorus pentafluoride, phosphorus trichloride, phosphorus oxytrichloride, titanium tetrachloride, boron trifluoride, boron trichloride, boron tribromide, antimony trichloride, and antimony pentachloride, a polymer solute comprising aromatic moieties directly linked by divalent, trivalent or tetravalent sulfur or by divalent oxygen and a dopant solute comprising a halide or oxyhalide anion of a group IIIA, IIIB, IVA, IVB, VA, VB, VIIIA or VIB metal or metalloid or of phosphorus, selenium, boron or sulfur; and
    (b) removing from the solution the solvent as the polymer solute solidifies.

2. The process of claim 1 wherein said solvent is removed by evaporation.

3. The process of claim 2 wherein the solution is subjected to evaporation on a substrate so as to form a film.

4. The process of claim 2 wherein the solution is subjected to evaporation in a shaped mold so as to form a shaped article.

5. The process of claim 2 wherein said solution is subjected to evaporation in the presence of a substrate insoluble in said solution so as to form a coating on the substrate.

6. The process of claim 1 wherein said solvent is removed by extraction into a non-solvent for the conductive article.

7. The process of claim 1 wherein said solution is subjected to DC current.

8. The process of claim 1 wherein said polymer solute is poly(p-phenylene sulfide).

* * * * *